Feb. 18, 1936.                H. N. WHITE                    2,031,399
                     AUTOMOBILE POWER TAKE-OFF MECHANISM
                            Filed Feb. 16, 1934
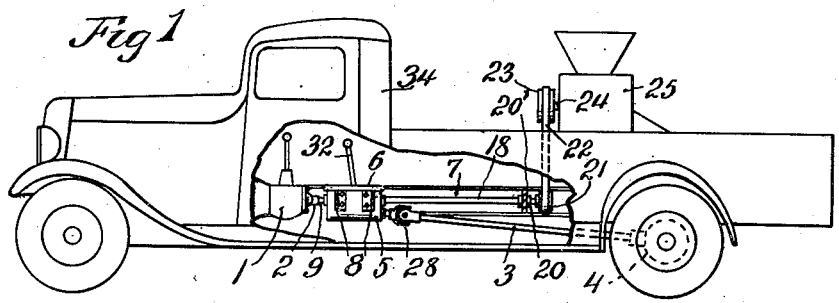
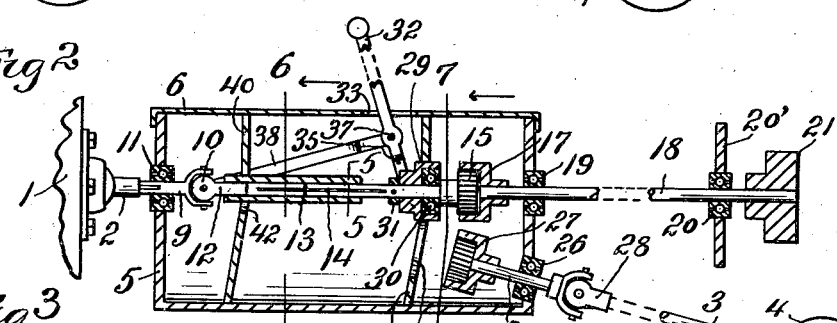
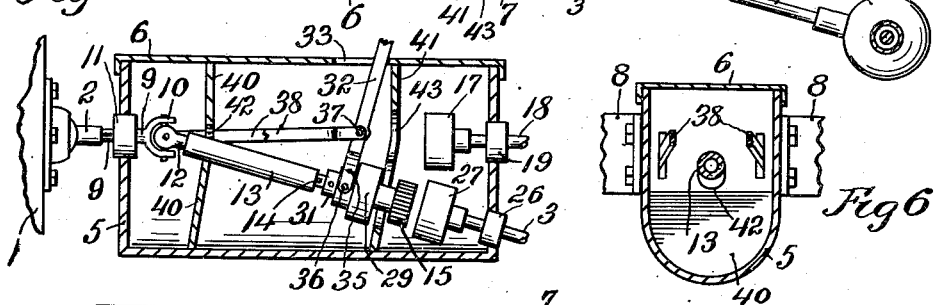
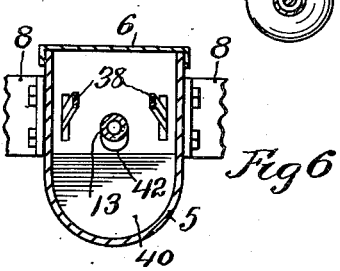
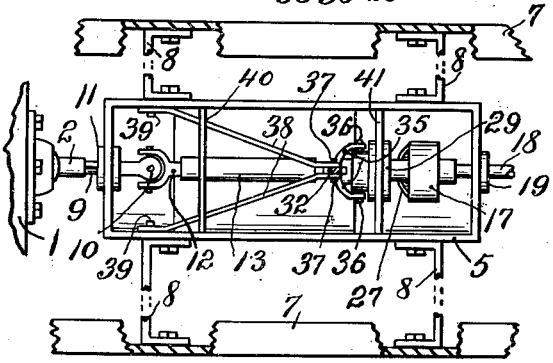
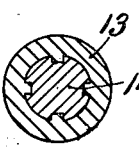
INVENTOR.
Holice N. White
BY Warren D. House
His ATTORNEY Patented Feb. 18, 1936

2,031,399

UNITED STATES PATENT OFFICE 2,031,399

AUTOMOBILE POWER TAKE-OFF MECHANISM

Holice N. White, Cameron, Mo.

Application February 16, 1934, Serial No. 711,476

8 Claims. (Cl. 74—11)

My invention relates to improvements in automobile power take off mechanisms.

One of the objects of my invention is to provide a novel power take off mechanism which is simple, cheap to install in a car under construction or to be applied to a car already in use, which is strong, durable, not likely to get out of order, which takes its power from the vehicle propelling universal joint at the rear of the transmission housing, which does not require any change in the latter, and which does not require any alteration of the transmission, and can receive its power directly from the engine crank shaft.

The novel features of my invention are hereinafter fully described and claimed.

In the accompanying drawing, which illustrates my invention,

Fig. 1 is a reduced side elevation of an automobile truck, partly broken away, provided with my improved power take off mechanism.

Fig. 2 is an enlarged side view, partly in elevation, partly in vertical section, and partly broken away, of my improved mechanism, showing the power take off member in driving engagement with the engine driven driving member.

Fig. 3 is a view similar to Fig. 2, showing the engine driven driving member in the position in which it is adapted to be moved lengthwise into driving engagement with the propeller shaft of the automobile.

Fig. 4 is a plan view of my improved mechanism, partly broken away, and the casing cover removed.

Fig. 5 is an enlarged section on the line 5—5 of Fig. 2.

Fig. 6 is an enlarged section on the line 6—6 of Fig. 2.

Fig. 7 is an enlarged section on the line 7—7 of Fig. 2.

Similar reference characters designate similar parts in the different views.

1 designates a rear portion of the usual transmission housing of an automobile, and 2 the rear end member of the vehicle propelling universal joint. 3 designates the propeller shaft, and 4 the differential housing of the automobile.

My improved mechanism is provided at the rear of the transmission housing 1 with a casing 5 having a removable cover 6, and located between and supported by the side channel beams 7 of the automobile frame, through the intermediacy of two pairs of bars 8 one set of ends of which are fastened to the sides of the casing 5 and the other ends being fastened to the beams 7.

9 designates the front member of a universal joint 10 located in the casing 5, said member 9 being rotatably supported in a ball bearing 11 mounted on the front end of the casing 5. Said member 9 extends forwardly and has driving engagement with the member 2 of the propelling universal joint, as by being splined thereto.

The rear member of the universal joint 10, designated by 12, extends into and is rigidly fastened to the front end of a rearwardly extending supporting member comprising, as shown, a tube 13, which, with the joint member 12, is adapted to swing vertically from the horizontal position, shown in Fig. 2 to the inclined position shown in Fig. 3.

Slidable longitudinally in and splined to the tube 13 is a longitudinal driving member comprising a shaft 14 to the rear end of which is fastened and rotatable therewith a clutch member, which, as shown, consists of a spur gear 15 adapted to be moved by the driving member 14 into driving engagement, as shown in Fig. 2, with a clutch member, consisting, as shown, in an internal gear 17, which is fastened to and rotatable with the front end of a power take off member comprising a longitudinal shaft 18.

The power take off shaft 18 extends at its front end portion into the casing 5 and is rotatably mounted in a ball bearing 19 mounted on the rear end of the casing 5. The power take off shaft 18 near its rear end is mounted in a ball bearing 20 mounted on a transverse bar 20' supported at its ends by the side channel beams 7. On the power take off shaft 18 is shown fastened a pulley 21 which is connected by a belt 22, with a pulley 23 mounted on the drive shaft 24, Fig. 1, of a grinding machine 25 mounted on the car body. This construction is merely representative of one form of mechanism to which the power take off shaft 18 may be connected for operating purposes. The power take off shaft 18 may be connected in driving relationship to many kinds of mechanisms which it is desired to be operated by the automobile engine.

With the use of my improved mechanism, the front portion of the propeller shaft 3 is not directly connected with the rear end member 2 of the vehicle propelling universal joint, as is usual, but the propeller shaft 3 is shortened and extends through the rear end of the casing 5 and is rotatably mounted in a ball bearing 26 mounted on the rear end of the casing 5. The forward end of the propeller shaft 3 has mounted on and rotatable with it a clutch member comprising, as shown, an internal gear 27, corresponding to the gear clutch member 17, and adapted to receive and have driving engagement with the clutch member 15, when the driving member 14 has been lowered to the position shown in Fig. 3, and then slid longitudinally rearwardly until the clutch member 15 enters and has driving engagement with the clutch member 27. The propeller shaft 3 at the rear of the casing 5 is provided with a universal joint 28, Figs. 1 and 2.

For raising and lowering the driving member 14 to the two positions respectively shown in Figs. 2 and 3, and for sliding it from the neutral positions shown in Figs. 2 and 3 into the driving positions in which it has driving engagement with the clutch members 17 and 27, there is provided in the casing 5 a collar 29 in which the driving member 14 is revolubly fitted in a ball bearing 30 carried by said collar 29. The front end of the collar 29 bears against a collar 31 rigidly fastened on the driving member 14, and the rear end of the ball bearing bears against the front end of the clutch member 15, so that when the collar 29 is moved forwardly and rearwardly, the driving member 14 will be longitudinally slid in the swinging supporting tube 13.

For vertically moving and longitudinally shifting the collar 29, there is provided a shifting lever 32, which extends upwardly through a slot 33 in the cover 6 into the cab 34 of the car, Fig. 1.

The lower end of the lever 32 is bifurcated and its arms 35 are respectively pivoted on two diametrically opposite pins 36 on the periphery of the collar 29. Above the arms 35, the lever 32 is pivoted on a transverse horizontal bolt 37 which extends through the rear ends of two links comprising longitudinal bars 38, the forward end portions of which are respectively pivoted on two horizontal bolts 39 mounted on the inner side walls of the casing 5 in alinement with the horizontal transverse axis of the universal joint 10, Figs. 2, 3 and 4.

For holding the tube 13 and driving member 14 from lateral movement, when they are swung upwardly and downwardly, guiding means is provided comprising two upwardly and downwardly extending partitions 40 and 41 extending in the casing 5 transversely between and to the inner walls of the casing to which the partitions are fastened.

As shown in Figs. 2, 3 and 6, the partition 41 is provided therethrough with an elliptical hole 42 having a width corresponding to the diameter of the tube 13 where the latter extends through the hole 42. The partition 41 is provided therethrough with a hole 43, Figs. 2, 3 and 7, having upper and lower arcuate portions of diameters corresponding to the diameter of the collar 29 adapted to revolve therein, and having a middle portion of a diameter corresponding to the diameter of the hub of the clutch member 15. When the tube 13 is disposed in either of the two positions, shown respectively in Figs. 2 and 3, and the collar 29 is in either the upper or lower portion of the hole 43, the partitions 40 and 41 will provide bearings for the tube 13 and collar 29, such as will serve to prevent wobbling of the tube and collar.

In the operation of the invention, when it is desired to drive the propeller shaft 3, and the parts are as shown in Fig. 3, the lever 32 is swung rearwardly at its upper end, so as to withdraw the clutch member 15 from the clutch member 17, after which the driving member 14 and the tube 13 can be lowered to the position shown in Fig. 3, the links 38 permitting of such downward movement also of the lever 32. The lever 32 is then forced forwardly at its upper end, thus forcing the driving member rearwardly to a position in which the clutch member 15 will enter the clutch member 27.

This operation is reversed, when it is desired to drive the power take off member 18, the lever 32 being forced rearwardly to withdraw the clutch member 15 from the clutch member 27 and then lifted until the collar 29 alines with the upper end of the hole 43, after which the lever 32 is forced forwardly at its upper end, thus engaging the clutch member 15 with the clutch member 17, as shown in Fig. 2.

By pivoting the lever 32 on an axis (the bolt 37) which is parallel with the axis (the bolts 39) of the link support 38 of the lever, and by having the axis of the link support alined with the horizontal axis of the universal joint 10, the axis of the lever always retains its relative position with respect to the swinging supporting tube 13, and the lever 32 is swung only in one, a vertical, plane in engaging and disengaging the driving shaft 14 with the propeller shaft 3 and with the take off shaft 18, and in swinging the lever to the positions for effecting such engagement and disengagement. This enables the lever to be very easily and quickly operated.

Various modifications of my invention, within the scope of the appended claims, may be made without departing from the spirit of my invention.

What I claim is:—

1. In an automobile power take off mechanism, the combination with the driving means and the propeller shaft of an automobile, of a rotary power take off member, supporting means rotatable by said driving means and adapted to swing to two positions, a driving member longitudinally slidable on and rotatable with said supporting means and movable to said two positions, a shifting lever, a clutch member on and rotatable with said driving member, a second clutch member fastened to and rotatable with said power take off member, a third clutch member attached to and rotatable with said propeller shaft, and means by which said lever can shift said driving member to said positions, and when the latter is in said positions said lever can move said driving member to positions in which the first named clutch member will respectively have driving engagement with said second and third clutch members.

2. In an automobile power take off mechanism, the combination with the driving means and the propeller shaft of an automobile, of a rotary power take off member, a support, a link pivoted to said support, a shifting lever pivoted to said link and adapted to swing therewith, a longitudinally movable rotary driving member, a clutch member on and rotatable with said driving member, swinging supporting means rotatable by said driving means and with said driving member and on which the latter is longitudinally movable, said supporting means being adapted to swing to bring said driving member to two positions, two clutch members respectively attached to said power take off member and to said propeller shaft and respectively having driving engagement with the first named clutch member, when said driving member swings with said supporting means to said two positions and said driving member has been moved longitudinally to the driving positions, and means by which said lever can shift said driving member to the first named positions and from thence to said driving positions.

3. In an automobile power take off mechanism, the combination with the driving means and the propeller shaft of an automobile, of a power take off member, rotary means including a supporting member rotatable by said driving means, said supporting member being adapted to move to two positions, a rotary driving member having telescopic sliding engagement and rotatable with said supporting member, a shifting lever, means actuated by said lever for moving said driving and supporting members to said two positions and for shifting said driving member on said supporting member to two driving positions, and means by which when said driving member is in said two driving positions it will have driving engagement with said power take off member and with said propeller shaft respectively.

4. In an automobile power take off mechanism, the combination with the driving means and the propeller shaft of an automobile, of a supporting casing, means rotatable by said driving means and including a rotary swinging supporting member movable to two positions, a rotary driving member rotatable with and having sliding engagement with said supporting member and movable therewith to said two positions, bearing means in said casing engaging said driving member and adapted to swing the latter and with it said supporting member to said two positions and to move said driving member, when in said positions, longitudinally to two driving positions, a link pivoted to said casing, a lever pivoted to and movable with said link for moving said bearing means to the first named two positions and to said two driving positions, a power take off member, and means by which said driving member when in said two driving positions will have driving engagement with said power take off member and said propeller shaft respectively.

5. In an automobile power take off mechanism, the combination with driving means and the propeller shaft of an automobile, a rotary power take off member, an intermediate driving shaft, swinging intermediate driving means permanently connected to and actuated by the first named driving means and carrying and having driving engagement with said rotary driving shaft, and a lever, of a swinging support on which said lever is fulcrumed and adapted to be swung about an axis parallel with its fulcrum axis, and means connecting said lever with said intermediate driving shaft by which the latter can be moved by said lever alternately into driving engagement with said propeller shaft and said power take off member.

6. In an automobile power take off mechanism, the combination with driving means and the propeller shaft of an automobile, a rotary power take off member, swinging intermediate driving means permanently connected to and actuated by the first named driving means, and a lever, of a support pivoted on the axis of said intermediate driving means, said lever being pivoted to said support on an axis parallel with the first named axis, and means connecting said lever with said intermediate driving means by which the latter can be moved by said lever alternately into driving engagement with said propeller shaft and said power take off member.

7. In an automobile power take off mechanism, the combination with driving means and the propeller shaft of an automobile, a rotary power take off member, swinging intermediate driving means permanently connected to and actuated by the first named driving means, and a lever, of a support on which said lever is pivoted, said support being pivoted on an axis parallel with the axis of said lever, means connecting said lever with said intermediate driving means by which the latter can be moved alternately by said lever into driving engagement with said propeller shaft and said power take off member, and guiding means cooperating with said lever by which said intermediate driving means when disconnected from said propeller shaft and said power take off member may be supported in two positions in which it will aline with said propeller shaft and said power take off member respectively.

8. In an automobile power take off mechanism, the combination with driving means and the propeller shaft of an automobile, a rotary power take off member, an intermediate driving shaft, swinging intermediate driving means connected to and actuated by the first named driving means and carrying and having driving engagement with said rotary driving shaft, of a swinging support having an axis alined with the axis of said swinging driving means, a lever pivoted to said support on an axis parallel with the axis of said support, and means connecting said lever with said intermediate driving shaft by which the latter can be moved by said lever alternately into driving engagement with said propeller shaft and said power take off member.

HOLICE N. WHITE.